(12) United States Patent
Okisu et al.

(10) Patent No.: US 6,614,996 B2
(45) Date of Patent: Sep. 2, 2003

(54) IMAGE FORMING APPARATUS AND IMAGE FORMING METHOD

(75) Inventors: Noriyuki Okisu, Osakasayama (JP); Jun Minakuti, Sakai (JP); Ayumi Itoh, Ikoma-gun (JP); Motohiro Nakanishi, Kobe (JP); Shoichi Minato, Sakai (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 10/187,022

(22) Filed: Jul. 1, 2002

(65) Prior Publication Data
US 2003/0026607 A1 Feb. 6, 2003

(30) Foreign Application Priority Data
Jul. 4, 2001 (JP) .......................................... 2001-203620

(51) Int. Cl.7 ............................................... G03B 17/18
(52) U.S. Cl. ........................... 396/63; 396/67; 396/153; 396/213; 396/287; 396/374; 348/333.02; 348/362
(58) Field of Search ............................. 396/67, 63, 65, 396/287, 296, 291, 374, 429, 238, 239, 243, 153; 348/333.02, 333.11, 64, 362

(56) References Cited
U.S. PATENT DOCUMENTS 5,915,133 A    6/1999  Hirai et al. .................... 396/48
5,950,031 A  * 9/1999  Yamagata ..................... 396/429

* cited by examiner

Primary Examiner—W. B. Perkey
(74) Attorney, Agent, or Firm—Sidley Austin Brown & Wood LLP

(57) ABSTRACT

An image forming apparatus automatically determines the photographing mode and displays on a display a kind of the photographing mode with the image of the subject.

The image forming apparatus comprises an image pickup part for forming an image of the subject, a photographing mode automatically setting part for automatically selecting one photographing mode from among a plurality of photographing modes based on a photographing condition when the subject is photographed, and setting the selected photographing mode, a display part for displaying the image of the subject; and a display control part for displaying on the display part a kind of the photographing mode set by the photographing mode automatically setting part together with the image of the subject.

15 Claims, 12 Drawing Sheets

IMAGE FORMING APPARATUS AND IMAGE FORMING METHOD

This application is based on Japanese Patent Application No. Hei 2002-203620 filed in Japan on Jul. 4, 2001, the entire content of which is hereby incorporated by reference.

FIELD OF THE INVENTION

The present invention relates to a technology for automatically determining the photographing mode when a subject is photographed in an image forming apparatus such as a digital camera.

DESCRIPTION OF RELATED ART

Some conventional film-based cameras are designed so as to automatically determine the photographing mode according to the photographing condition of the subject when the subject is photographed. Examples of the photographing mode include a portrait mode, a sport mode and a landscape mode. One photographing mode is selected from among a plurality of photographing modes according to the photographing condition such as the photographing magnification and the focal length when a subject is photographed, and a corresponding processing configuration preset for the selected photographing mode is set. For example, when one photographing mode is selected, according to the selected photographing mode, whether to use flash or not at the time of photographing is determined or the contents of exposure control are determined.

However, in the case of the conventional film-based cameras, even though a subject is photographed by applying the automatically determined photographing mode, it is unknown whether an image desired by the user is obtained or not. Therefore, when a photographing mode different from the photographing mode for expressing the user's photographing intention is automatically determined, photographing is performed without the user's photographing intention being clearly expressed.

SUMMARY OF THE INVENTION

The present invention is made to solve the above-mentioned problem, and an object thereof is to provide an image forming apparatus and an image forming method capable of reducing failure in photographing due to a mis-determination of the photographing mode when the automatic determination of the photographing mode is performed.

The above-mentioned object is attained by providing an image forming apparatus and an image forming method structured as described below.

An image forming apparatus of the present invention comprises: an image pickup part for forming an image of the subject, a selecting part for automatically selecting a photographing mode at the time of photographing, a display part for displaying the image of the subject; and a display control part for displaying a kind of the photographing mode selected by the selecting part and the image of the subject on the display part.

Further, in the image forming apparatus of the present invention, the photographing mode is displayed by the display control part so as to be superimposed on the image of the subject.

Further, in the image forming apparatus of the present invention, the selecting part selects one photographing mode from among a plurality of photographing modes based on a photographing condition when the subject is photographed.

Further, in the image forming apparatus of the present invention, the photographing condition is at least one of the photographing magnification, the focal length, the luminance, the light source and the movement of the subject.

Further, in the image forming apparatus of the present invention, the selecting part sets a photographing control parameter at least one of the exposure control, whether to use flash or not, the gamma correction value, the sharpness processing and the color correction value in accordance with the selected photographing mode.

DETAILED DESCRIPTION OF THE PREFERRED EMBODIMENT

The embodiment shown below will be described with a digital camera as an example of the image forming apparatus.

<1. Structure of the Digital Camera>

Figure 1:
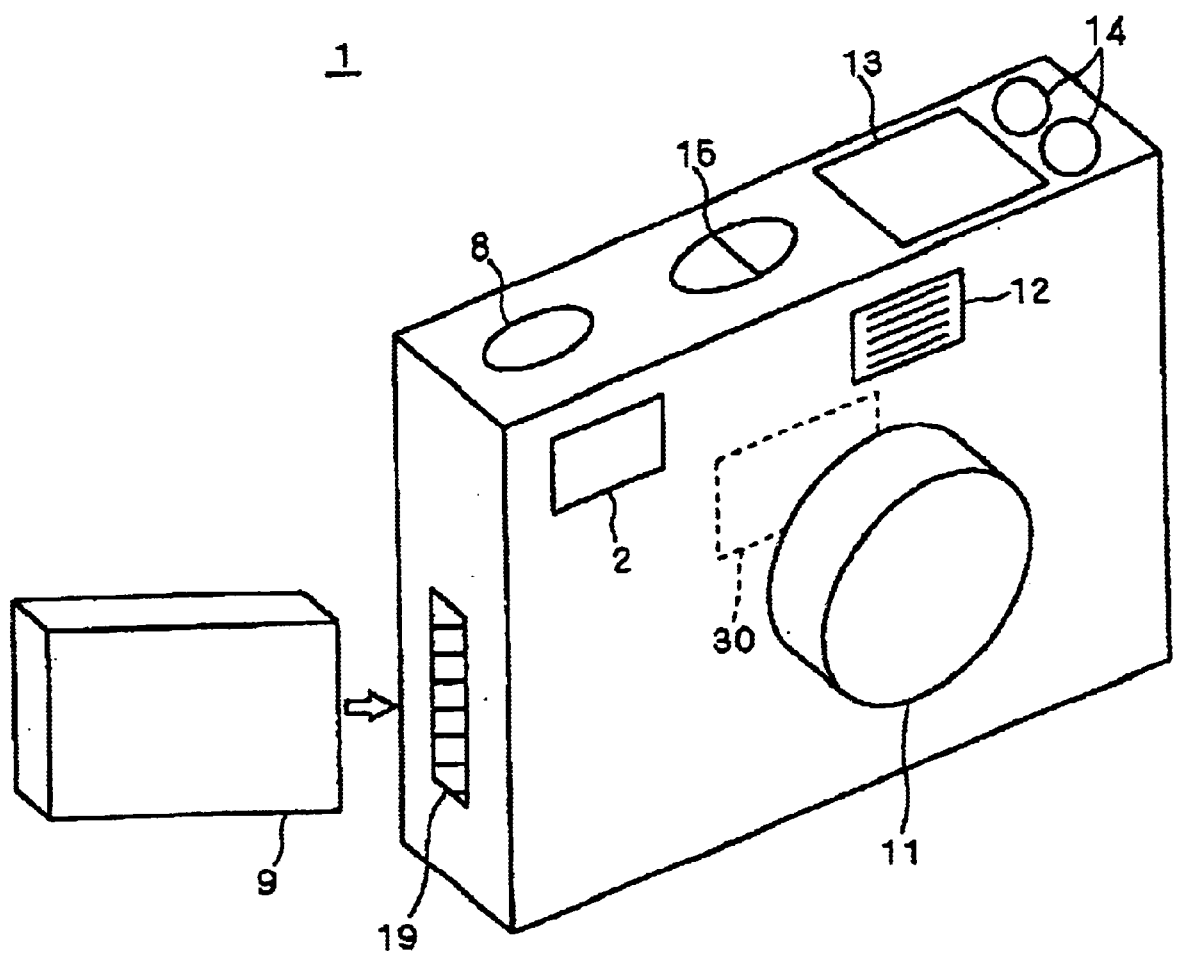
FIG. 1 is a perspective view showing a digital camera 1 according to an embodiment of the present invention.
Figure 2:
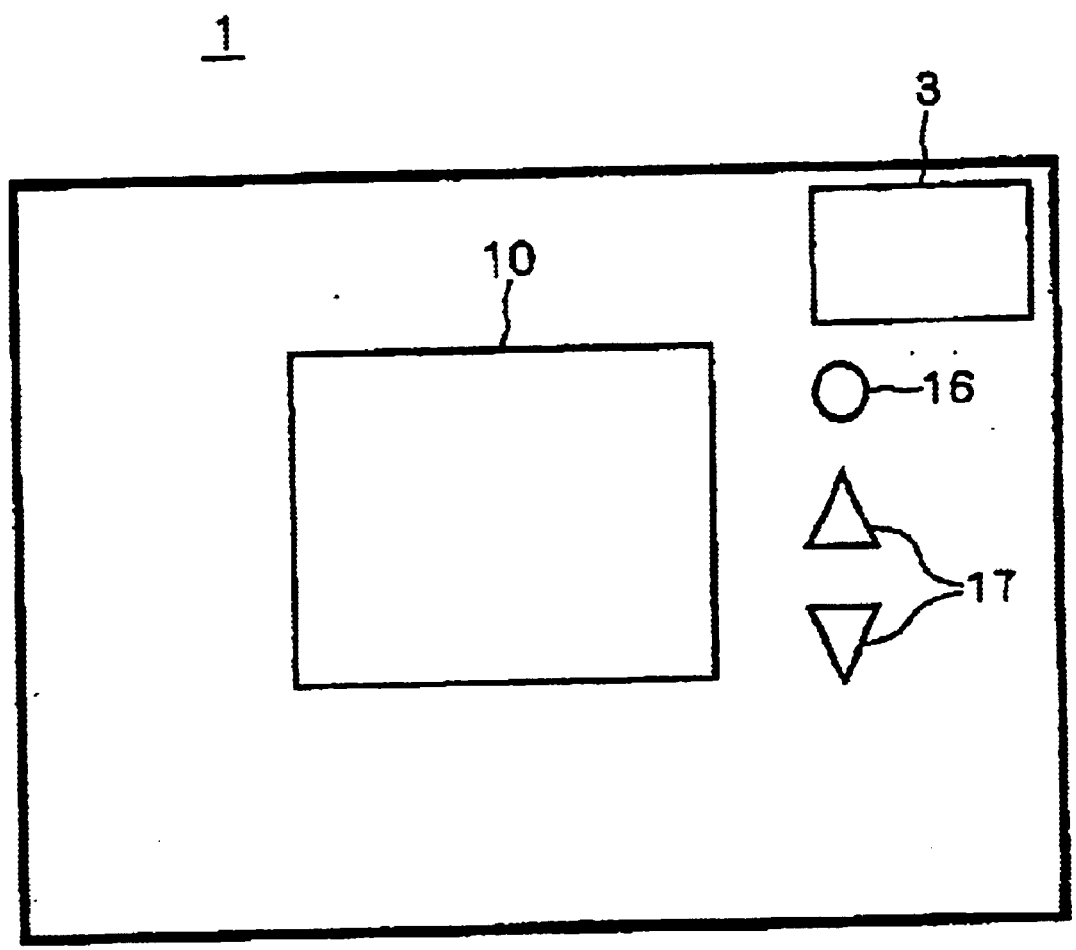
FIG. 2 is a rear view of the digital camera.

FIG. 1 is a perspective view showing a digital camera 1 according to an embodiment of the present invention. FIG. 2 is a rear view of the digital camera 1.

As shown in FIG. 1, a taking lens 11 and a finder window 2 are provided on the front surface of the digital camera 1. Inside the taking lens 11, a CCD image sensing device 30 is provided as image forming means for generating an image signal (signal comprising an array of pixel data of pixels) by photoelectrically converting a subject image incident through the taking lens 11.

The taking lens 11 includes a lens system movable in the direction of the optical axis, and is capable of realizing in-focus state of the subject image formed on the CCD image sensing device 30 by driving the lens system by a CPU described later. The taking lens 11 also includes a zoom lens, and is capable of varying the magnification of the subject image formed on the CCD image sensing device 30 by driving the zoom lens. The taking lens 11 may be provided with a diaphragm.

A flash 12 illuminating the subject when the subject is photographed is provided on the front surface of the digital camera 1. The subject can be photographed with an appropriate brightness by causing the flash 12 to fire as required when the subject is photographed.

A release button 8, a camera condition display 13, photographing mode setting keys 14 and a zoom key 15 are disposed on the upper surface of the digital camera 1.

The release button 8 which the user depresses when photographing a subject is a two-stroke switch capable of distinction between half depression and full depression. The camera condition display 13 comprising, for example, a liquid crystal display of a segment display type is provided for indicating the contents of the current setting of the digital camera 1 to the user.

The photographing mode setting keys 14 are switches for manually changing the photographing mode to change, according to the subject, the exposure condition such as aperture priority photographing, shutter speed priority photographing and depth priority photographing and the image processing condition such as white balance and gamma correction at the time of photographing by the digital camera 1.

The zoom key 15 is a switch for manually operating the zoom lens included in the taking lens 11. The zoom key 15 includes two button switches, a wide button and a tele button, and is capable of manually setting the photographing magnification at the time of photographing of the subject to the condition desired by the user.

An insertion portion 19 for inserting a recording medium 9 for recording image data obtained by photographing (photographing for recording) is formed on a side surface of the digital camera 1, and the recording medium 9 which is interchangeable can be inserted therein.

A liquid crystal display 10, a finder display 3, a photographing mode automatic selection/manual selection switching key (hereinafter, referred to as switching key) 16 and a cursor key 17 are provided on the back surface of the digital camera 1.

The liquid crystal display 10 functions as display means for displaying a photographed image obtained by photographing a subject and various kinds of information. The liquid crystal display 10 displays a so-called live view image after the digital camera 1 is turned on. The live view image is an image for display obtained by successively performing photographing by the CCD image sensing device 30, and is different from an image for recording photographed when the user provides a photographing instruction. The various kinds of information displayed on the liquid crystal display 10 include information on the photographing mode.

The finder display 3 is also display means for displaying a subject image. For example, a subject image incident through the finder window 2 disposed on the front surface of the digital camera 1 is displayed within the finder display 3. The display form of the subject image on the finder display 3 may be a display form like the so-called optical finder or may be a display form using a small-size liquid crystal display or the like and displaying an electronic image.

The switching key 16 is a key switch for switching between automatic selection and manual selection of the photographing mode. When the user depresses the switching key 16, the photographing mode selection form is switched. The operation on the photographing mode setting keys 14 is effective when manual selection is set by the switching key 16.

The cursor key 17 is for the user to change various setting conditions of the digital camera 1.

Figure 3:
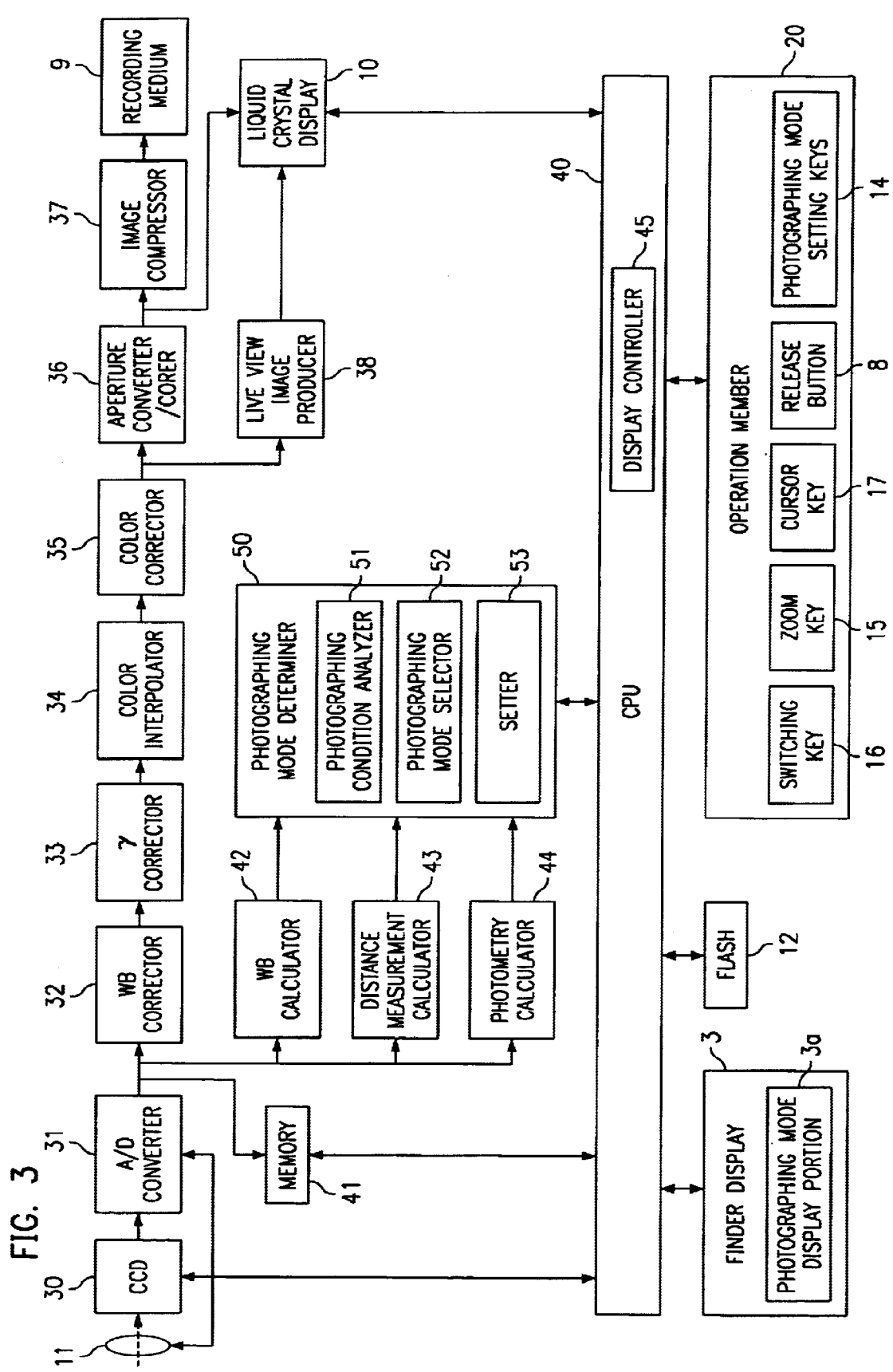
FIG. 3 is a block diagram showing the internal structure of the digital camera.

FIG. 3 is a block diagram showing the internal structure of the digital camera 1.

At the time of photographing for recording, the subject image formed on the CCD image sensing device 30 through the taking lens 11 is converted to an electric image signal at the CCD image sensing device 30, and is recorded onto the recording medium 9 by way of an A/D converter 31, a WB (white balance) corrector 32, a gamma corrector 33, a color interpolator 34, a color corrector 35, an aperture converter/corer 36 and an image compressor 37. The image data output from the A/D converter 31 is temporarily stored in a memory 41. The image data output from the aperture converter/corer 36 is supplied to the liquid crystal display 10 to display the photographed image (image for recording) obtained by photographing.

At the time of live view display, the subject image formed on the CCD image sensing device 30 through the taking lens 11 is converted to an electric image signal at the CCD image sensing device 30, and is supplied to the liquid crystal display 10 by way of the A/D converter 31, the WB corrector 32, the gamma corrector 33, the color interpolator 34, the color corrector 35 and a live view image producer 38. At this time, the CCD image sensing device 30 continuously repeats photographing, and a real-time image as to the subject is successively displayed on the liquid crystal display 10. At the time of live view display, the image data output from the A/D converter 31 is supplied to a WB calculator 42, a distance measurement calculator 43 and a photometry calculator 44.

The A/D converter 31 converts the image signal output from the CCD image sensing device 30, for example, into a digital signal of 8 bits per pixel. The WB corrector 32 adjusts the white balance of the image obtained by photographing a subject, based on a white balance value set by the WB calculator 42. The gamma corrector 33 performs gamma conversion based on the gamma characteristic set by a control CPU 40, on the image data obtained from the WB corrector 32. The color interpolator 34 performs color interpolation on each pixel of the image data input from the gamma corrector 33, and obtains the color component values of R (red), G (green) and B (blue) of each pixel. The color corrector 35 corrects the color component value of each pixel of the image data input from the color interpolator 34, and generates a color image suitable for viewing. The aperture converter/corer 36 adjusts the image sharpness while removing noise of the image data. The image compressor 37 has the function of compressing the photographed image obtained from the aperture converter/corer 36 to reduce the data amount, and recording the image data onto the recording medium 9. The recording medium 9 comprises a memory card incorporating a semiconductor memory or a magnetic disk card incorporating a magnetic disk unit.

The live view image producer 38 produces a live view image by adjusting the image data obtained from the color corrector 35 to the display size of the liquid crystal display 10, and supplies the live view image to the liquid crystal display 10.

The WB calculator 42 obtains an appropriate white balance set value by analyzing the image data obtained by the CCD image sensing device 30 successively photographing an image at the time of live view display. The white balance set value is supplied to the WB corrector 32, and white balance adjustment at the time of photographing for recoding is performed. The WB calculator 42 also determines whether the light source illuminating the subject is daylight or room light when analyzing the image data, and supplies the result of the determination to a photographing mode determiner 50.

The distance measurement calculator 43 is provided for realizing automatic focusing in the digital camera 1, and measures the distance between the digital camera 1 and the subject based on the image data obtained by the CCD image sensing device 30 successively photographing an image, for example, at the time of live view display. When the distance measurement calculator 43 successively performs distance measurement at the time of live view display, whether the subject is a dynamic object (moving object) or a static object (stationary object) can be determined by comparing the previous distance measurement value and the current distance measurement value with each other. For example, when the finite difference between the previous distance measurement value and the current distance measurement value is not less than a predetermined threshold value, it can be determined that the subject is a dynamic object, and when the finite difference is less than the predetermined threshold value, it can be determined that the subject is a static object.

Then, the distance measurement calculator 43 supplies the control CPU 40 with the distance measurement value obtained by inputting the image data. The control CPU 40 drives the taking lens 11 based on the distance measurement value input from the distance measurement calculator 43 to perform automatic focusing control.

The distance measurement calculator 43 also supplies the photographing mode determiner 50 with information representative of whether the subject is a dynamic object or a static object.

The photometry calculator 44 analyzes the condition of the brightness (luminance) of the subject based on the image data, and supplies the result of the analysis to the control CPU 40 and the photographing mode determiner 50. By the photometry by the photometry calculator 44, the control CPU 40 can determine the necessity of firing of the flash 12.

The memory 41 is storage means for storing the image data photographed by the CCD image sensing device 30 and output from the A/D converter 31 at the time of photographing for recording, and is controlled by the control CPU 40. The image data stored in the memory 41 is output to the WB corrector 32 or the like in response to a control signal from the control CPU 40.

The control CPU 40 functions as control means for executing a predetermined control program and controlling the above-described elements when the digital camera 1 is turned on. In that case, the control CPU 40 receives a signal from an operation input portion (operation member) 20 including the release button 8, the photographing mode setting keys 14, the zoom key 15, the cursor key 17 and the switching key 16, and performs a control operation corresponding to the contents of the user's instruction. The control CPU 40 also controls the firing of the flash 12 at the time of photographing for recording. The control CPU 40 also functions as a display controller 45 controlling a photographing mode display portion 3a provided in the finder display 3 to display the photographing mode on the finder display 3 and performing display control of the photographing mode display portion 3a and the liquid crystal display 10 so that the photographing mode is displayed on the liquid crystal display 10.

At the time of live view display, the control CPU 40 drives the taking lens 11 based on the distance measurement value obtained from the distance measurement calculator 43 to thereby perform automatic focusing. When the zoom key 15 is operated by the user, the zoom lens included in the taking lens 11 is driven in accordance with the operation amount of the zoom key 15. Consequently, the control CPU 40 can obtain the photographing magnification and the focal length of the taking lens 11. The control CPU 40 obtains the photographing magnification and the focal length of the taking lens 11, and supplies the information to the photographing mode determiner 50.

The photographing mode determiner 50 functions as photographing mode automatically setting means for automatically selecting one photographing mode from among a plurality of photographing modes based on the photographing condition when a subject is photographed, and automatically setting various parameters based on the selected photographing mode. The photographing condition is the condition of the subject and the setting condition of the digital camera 1 when the subject is photographed. In the present embodiment, the photographing condition is the photographing magnification and the focal length of the taking lens, the luminance (brightness) of the subject, the kind of the light source illuminating the subject and the condition of the subject, and the photographing mode determiner 50 automatically determines one photographing mode in accordance with these conditions.

The photographing mode determiner 50 is provided with a photographing condition analyzer 51, a photographing mode selector 52 and a setter 53.

The photographing condition analyzer 51 analyzes information representative of whether the light source illuminating the subject is daylight or room light which information is input from the WB calculator 42, information representative of whether the subject is a dynamic object or a static object which information is input from the distance measurement calculator 43, information on the luminance of the subject input from the photometry calculator 44, and the photographing magnification and the focal length of the taking lens input from the control CPU 40, and determines the contents of the photographing condition of the digital camera 1.

The photographing mode selector 52 selects one photographing mode from among a plurality of photographing modes based on the result of the analysis by the photographing condition analyzer 51. In the present embodiment, as the photographing modes, the portrait mode, the sport mode, the landscape mode and a snap mode are prepared. The photographing mode selector 52 selects one photographing mode suitable for the photographing condition with reference to table data where the photographing condition and the photographing modes are associated with each other. The following is an example of the table data:

TABLE 1

| Photographing mode | Photographing magnification | Focal length | Luminance | Light source | Subject |
|---|---|---|---|---|---|
| Portrait mode | 1/15–1/60 | 50–105 | Normal | Daylight/room light | Static |
| Sport mode | 1/80- | 80- | Normal | Daylight/room light | Dynamic |
| Landscape mode | 1/80- | -50 | Normal | Daylight | Static |
| Snap mode | Cases other than the above | | | | |

As shown in TABLE 1, the photographing mode selector 52 selects the portrait mode as the photographing mode when the photographing magnification is "1/50 to 1/60," the focal length is "50 to 105," the luminance is "normal," the light source is "daylight or room light," and the subject is a "static object." The photographing mode selector 52 selects the sport mode as the photographing mode when the photographing magnification is "not less than 1/80," the focal length is "not less than 80," the luminance is "normal," the light source is "daylight or room light," and the subject is a "dynamic object." The photographing mode selector 52 selects the landscape mode as the photographing mode when the photographing magnification is "not less than 1/80," the focal length is "not more than 50," the luminance is "normal," the light source is "daylight," and the subject is a "static object." In cases applying to none of the above-described photographing modes, the photographing mode selector 52 selects the snap mode as the photographing mode.

The photographing mode selector 52 supplies the photographing mode selected as described above to the control CPU 40.

At the control CPU 40, the display controller 45 functions, and at the time of live view display, the photographing mode as well as the live view image is displayed on the liquid crystal display 10. At the same time, the photographing mode is displayed in the photographing mode display portion 3a of the finder display 3. By the display controller 45 displaying the photographing mode as well as the subject image on the liquid crystal display 10 and the photographing mode display portion 3a, the user can easily check the photographing mode automatically determined by the photographing mode determiner 50 at the same time when checking the subject image. Thus, it can be checked whether or not the automatically determined photographing mode is the one desired by the user, so that failure in photographing can be prevented.

The setter 53 sets various photographing parameters in the internal processing of the digital camera 1 based on the photographing mode selected by the photographing mode selector 52. In the present embodiment, as examples of the parameters, the exposure control, the flash control, the gamma correction value, the sharpness processing and the color correction value are set. These parameters are stored in a memory in the setter 53 as table data associated with the photographing modes, and the setter 53 obtains the photographing parameters suitable for the selected photographing mode with reference to the table data. The setter 53 sets for each element the photographing parameters obtained from the table data. The following is an example of the table data:

TABLE 2

| Photographing mode | Exposure control | Flash | Gamma correction | sharpness | Color correction |
|---|---|---|---|---|---|
| Portrait mode | Rather over | Automatic | Contrast rather low | Rather soft | Standard |
| Sport mode | Shutter priority | Automatic | Contrast rather high | Rather sharp | Standard |
| Landscape mode | Standard | Inhibited | Standard | Rather sharp | Chroma rather high |
| Snap mode | Standard | Automatic | Standard | Standard | Standard |

As shown in TABLE 2, when the portrait mode is selected as the photographing mode, the setter 53 sets the exposure control to "rather over," the flash control to "automatic," the gamma correction value to "contrast rather weak," the sharpness processing to "rather soft," and the color correction value to "standard." By setting such photographing parameters, parameters enabling a person subject to be photographed under an appropriate condition are set.

When the sport mode is set, the setter 53 sets the exposure control to "shutter priority," the flash control to "automatic," the gamma correction value to "contrast rather high," the sharpness processing to "rather sharp," and the color correction value to "standard." By setting such photographing parameters, parameters enabling a moving subject to be photographed under an appropriate condition are set.

When the landscape mode is set, the setter 53 sets the exposure control to "standard," the flash control to "inhibited," the gamma correction value to "standard," the sharpness processing to "rather sharp," and the color correction value to "chroma rather high." By setting such photographing parameters, parameters enabling a landscape to be vividly photographed are set.

When the snap mode is set, the setter 53 sets the exposure control to "standard," the flash control to "automatic," the gamma correction value to "standard," the sharpness processing to "standard," and the color correction value to "standard." By setting such photographing parameters, a standard photographed image is obtained by photographing.

At the time of live view display, the control CPU 40 controls the operation of the taking lens 11 based on the setting parameters set by the setter 53. The gamma corrector 33, the color corrector 35 and the aperture converter/corer 36 each operate so as to perform the image processing of the contents set by the setter 53.

Consequently, at the time of live view display, the automatically selected photographing mode is displayed on the liquid crystal display 10, and a live view image in which the automatically selected photographing mode is reflected is displayed.

Figure 4:
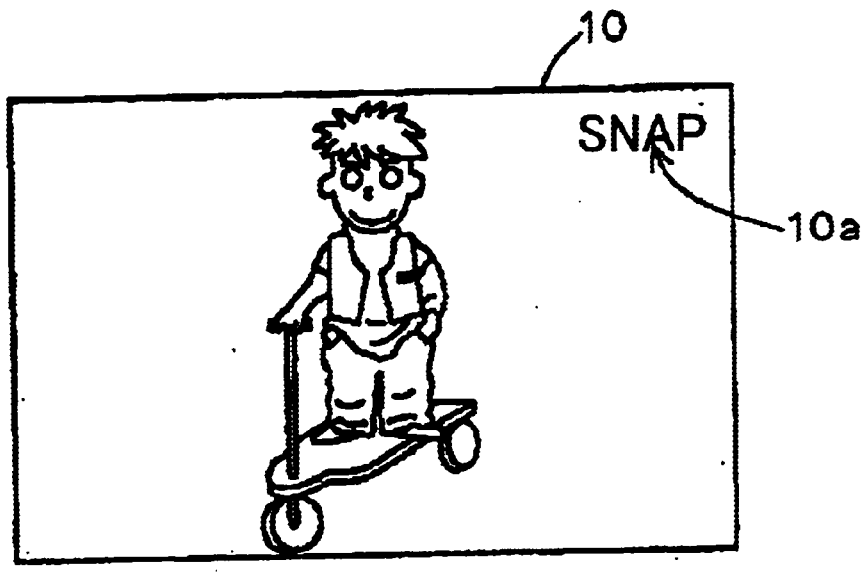
FIG. 4 is a view showing an example of the display screen of a liquid crystal display.
Figure 5:
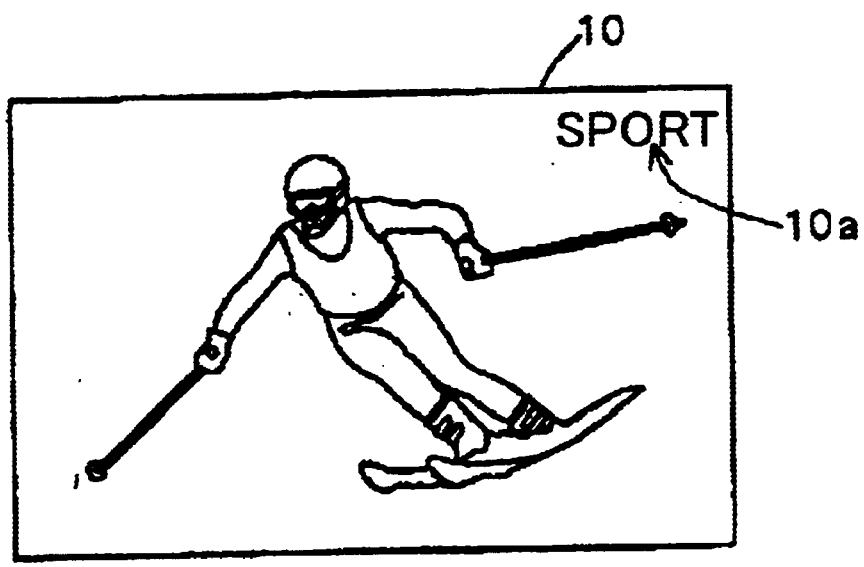
FIG. 5 is a view showing an example of the display screen of the liquid crystal display.

FIGS. 4 and 5 each show an example of the display screen of the liquid crystal display 10. FIG. 4 shows a display screen when the snap mode is automatically determined. FIG. 5 shows a display screen when the sport mode is automatically determined.

As shown in FIGS. 4 and 5, in the digital camera 1, the photographing mode is automatically determined based on the photographing condition, and the automatically determined photographing mode is displayed. The display of the photographing mode is provided as character information in a photographing mode display area 10a, for example, in an upper right part of the screen not hindering the display of the subject image. That is, the display of the photographing mode is provided so as to be superimposed on the subject image.

Consequently, by viewing the display screen of the liquid crystal display 10, the user can easily recognize which one of the photographing modes is automatically determined, at the same time when recognizing the subject image. Since this display screen enables the user to check in advance whether the photographing mode suitable for the condition of the subject (photographing scene) is automatically selected or not, failure in photographing due to a mis-determination of the photographing mode at the time of photographing for recording can be reduced.

Figure 6:
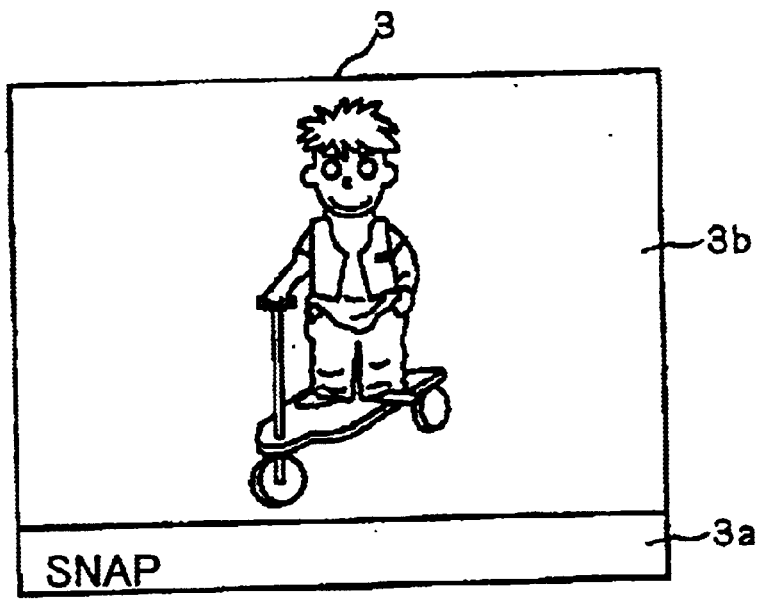
FIG. 6 is a view showing an example of the display screen of a finder display.
Figure 7:
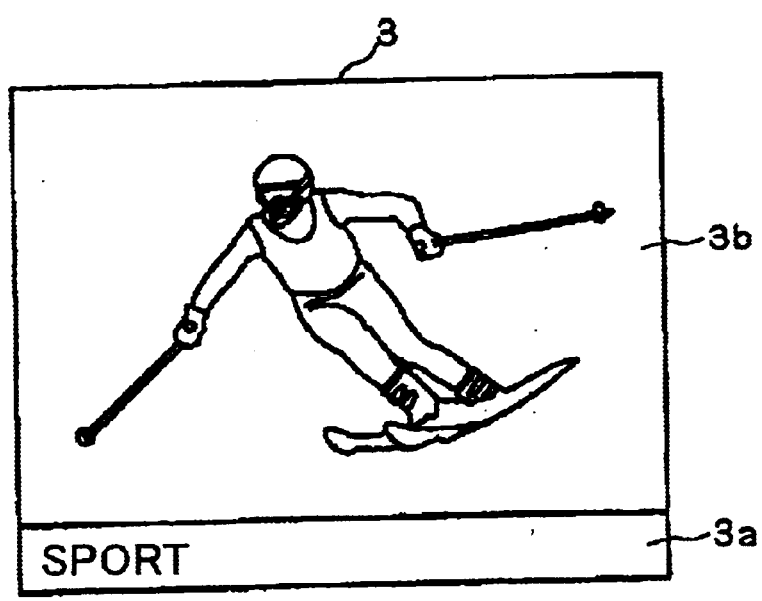
FIG. 7 is a view showing an example of the display screen of the finder display.

In the present embodiment, the photographing mode is also displayed on the finder display 3. FIGS. 6 and 7 each show an example of the display screen of the finder display 3. FIG. 6 shows a display screen when the snap mode is automatically determined. FIG. 7 shows a display screen when the sport mode is automatically determined.

When the user holds the digital camera 1 to perform photographing for recording of a subject with the digital camera 1, like in the case of a film-based camera, the user frequently performs framing of the subject while viewing the finder display 3. Moreover, the user sometimes turns off the display function of the liquid crystal display 10 to suppress power consumption.

Therefore, as shown in FIGS. 6 and 7, by the photographing mode automatically determined based on the photographing condition being displayed in the photographing mode display portion 3a provided below an image display portion 3b of the finder display 3 of the digital camera 1, the user can easily recognize which one of the photographing modes is automatically set when viewing the finder display 3. Since the user can check whether the photographing mode suitable for the subject condition (photographing scene) is automatically selected or not before performing a photographing operation (release operation) by viewing the display screen of the finder display 3, failure in photographing due to a mis-determination of the photographing mode at the time of photographing for recording can be reduced.

In the digital camera 1, as described above, the kind of the photographing mode set by the photographing mode determiner 50 as well as the subject image is displayed on both the liquid crystal display 10 and the finder display 3 before the user performs the photographing operation. Therefore, in a case where automatic selection of the photographing mode is set, when the automatically determined photographing mode is the one desired by the user, the user performs the photographing operation without making any change in setting, and when the photographing mode desired by the user is not automatically selected, the user performs the photographing operation again to cause the automatic determination to be performed again, or the user changes the photographing mode selection form from automatic selection to manual selection by operating the switching key 16 and manually sets the photographing mode desired by the user.

Figure 8:
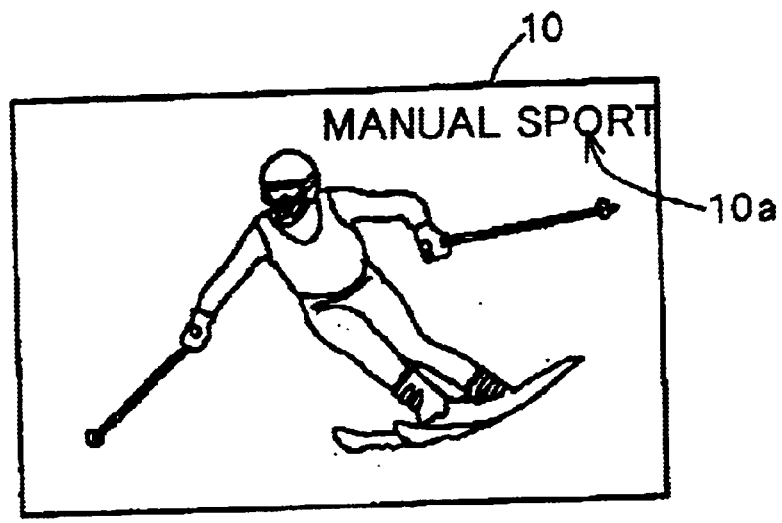
FIG. 8 is a view showing the display screen of the liquid crystal display when the user manually sets the photographing mode.
Figure 9:
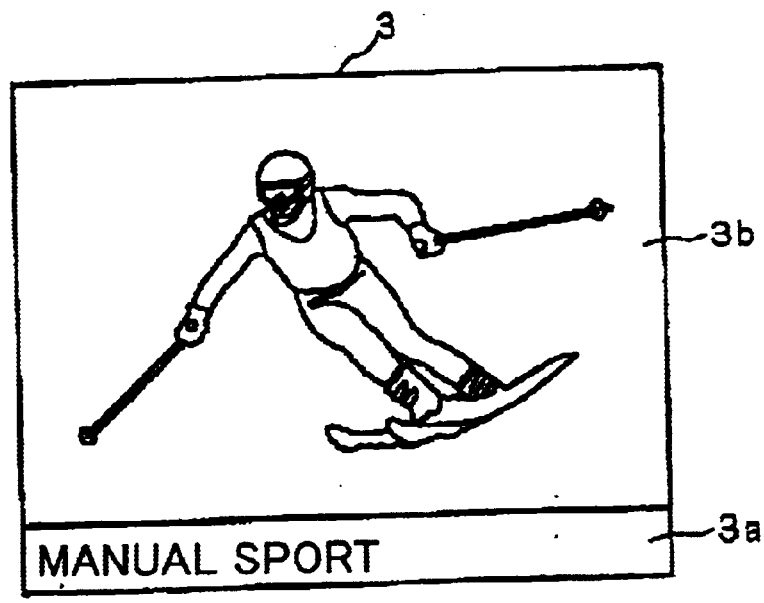
FIG. 9 is a view showing the display screen of the finder display when the user manually sets the photographing mode.

FIG. 8 is a view showing the display screen of the liquid crystal display 10 when the user manually sets the photographing mode. FIG. 9 shows the display screen of the finder display 3 when the user manually sets the photographing mode.

When the photographing mode is manually set in the digital camera 1, first, as shown in FIG. 8, on the liquid crystal display 10, it is displayed in the photographing mode display area 10a that the manual setting mode is on, and the manually set photographing mode is displayed. In the example of FIG. 8, the sport mode is set. As shown in FIG. 9, on the finder display portion 3, it is displayed in the photographing mode display portion 3a that the manual setting mode is on, and the manually set photographing mode is displayed. In the example of FIG. 9, the sport mode is also set.

To manually change the photographing mode, as described above, after switching to the manual setting mode by operating the switching key 16, the user operates the photographing mode setting keys 14. For example, every time one button key of the photographing mode setting keys 14 is depressed, the photographing mode is switched in order of the portrait mode, the sport mode, the landscape mode and the snap mode, and every time the other button key is depressed, the photographing mode is switched in reverse order to the above.

Every time the photographing mode is changed manually, the control CPU 40 functions as the display controller 45, and changes the display condition of the photographing mode on the liquid crystal display 10 and the display condition of the photographing mode display portion 3a of the finder display 3. Consequently, the user can easily determine whether the photographing mode when the subject is photographed is the one desired by him or not, so that failure in photographing for recording can be reduced.

Moreover, every time the photographing mode is changed manually, the control CPU 40 sets for each element various parameters corresponding to the manually set photographing mode with reference to the table data (TABLE 2) stored in the setter 53 of the photographing mode determiner 50.

As described above, every time the photographing mode is changed manually, not only the display contents on the display means such as the liquid crystal display 10 is changed but also the condition of the internal function for performing photographing for recording by the digital camera 1 is changed to the condition suitable for the set photographing mode.

In the present embodiment, the photographing mode can be changed also after photographing for recording is performed by the user performing the release operation. The image data obtained by the CCD image sensing device 30 at the time of photographing for recording is stored in the memory 41. This image data is a photographed image taken based on the photographing mode at the time of photographing for recording, and has not undergone the processings at the gamma corrector 33, the color corrector 35 and the aperture converter/corer 36 which processing are set based on the photographing mode. Therefore, by the user manually changing the photographing mode after photographing, photographing is performed in a specific photographing mode, and the contents of the processing on the image data stored in the memory 41 can be changed.

Figure 10:
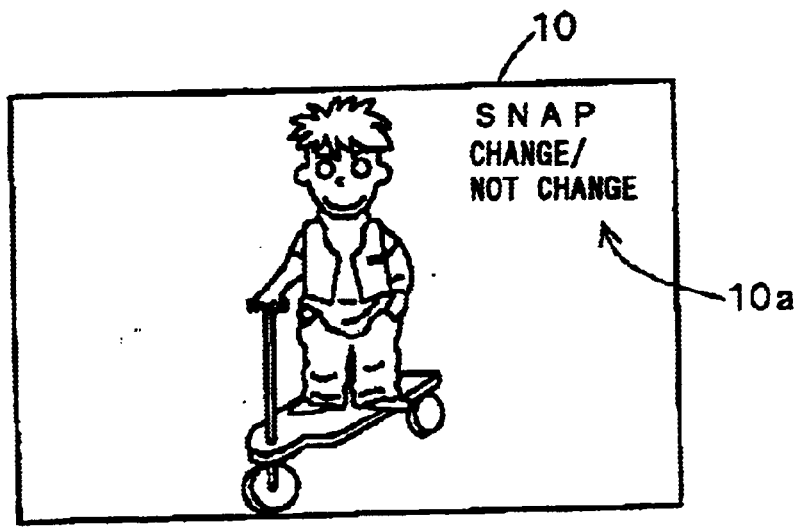
FIG. 10 shows a screen for checking the photographed image obtained by photographing for recording.

FIG. 10 shows a screen for checking the photographed image obtained by photographing for recording. As shown in FIG. 10, a photographed image photoelectrically converted by the CCD image sensing device 30 by photographing for recording and having undergone image processings in accordance with a specific photographing mode at image processors such as the gamma corrector 33, the color corrector 35 and the aperture converter/corer 36 is displayed on the liquid crystal display 10. At this time, a display of the photographing mode set at the time of photographing for recording and a display for asking the user whether to change the photographing mode or not are provided in the photographing mode display area 10a.

As the display for asking whether to change the photographing mode or not, a menu "change/not change" is displayed as shown in FIG. 10. After performing the release operation, the user visually checks the photographed image displayed on the liquid crystal display 10. When the finished quality of the image is not desired, the user can change the photographing mode by selecting "change" from the menu by operating the cursor key 17.

Figure 11:
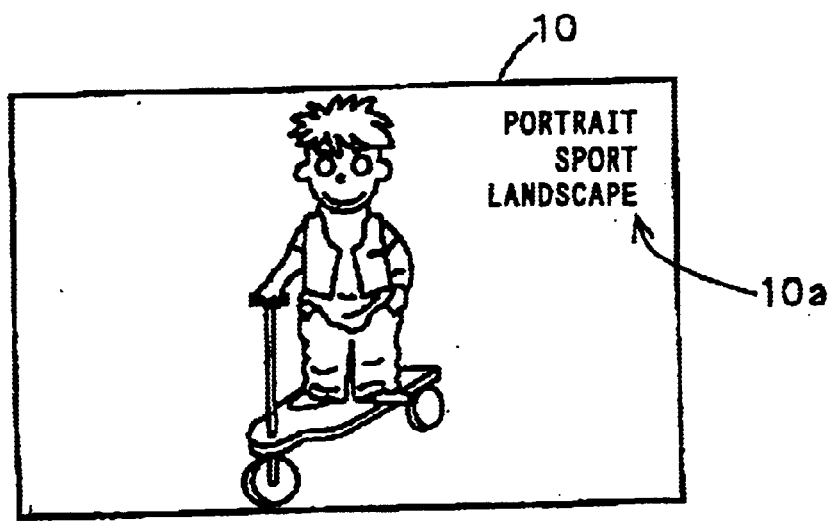
FIG. 11 is a view showing the operation screen when the user changes the photographing mode of the photographed image.

FIG. 11 is a view showing the operation screen when the user changes the photographing mode of the photographed image. As shown in FIG. 11, when the user selects to "change" the photographing mode, the display contents in the photographing mode display area 10a of the liquid crystal display 10 are updated, so that a plurality of photographing modes to one of which the photographing mode is to be changed is displayed in the photographing mode display area 10a. In the example of FIG. 11, since the photographing mode is changed from the snap mode of FIG. 10, the remaining three photographing modes (the portrait mode, the sport mode and the landscape mode) are displayed. The change of the display contents is made by the display controller 45 functioning at the control CPU 40.

The user selects one photographing mode from among the photographing modes from which the selection is to be made, by operating the cursor key 17 or the like.

When the photographing mode for the photographed image is changed manually, the control CPU 40 sets various image processing parameters corresponding to the manually set photographing mode, to the gamma corrector 33, the color corrector 35 and the aperture converter/corer 36 with reference to the table data (TABLE 2) stored in the setter 53 of the photographing mode determiner 50. Specifically, of the parameters in TABLE 2, only the parameters associated with the gamma correction value, the sharpness processing and the color correction value are extracted and set for the elements. Of the parameters in TABLE 2, the set value associated with the exposure control and the set value associated with the flash control are not read out because the change of the photographing mode made here is a change of the photographing mode made after photographing of the photographed image is performed and therefore, even if the parameters are obtained, it is impossible for the contents of the parameters to be reflected in the already obtained image data stored in the memory 41 by photographing.

After performing the setting based on the changed photographing mode on the image processors as described above, the control CPU 40 instructs the memory 41 to output image data, so that the image data of the photographed image stored in the memory 41 is output to the WB corrector 32. Then, after the image processings set at the elements from the WB corrector 32 to the aperture converter/corer 36 are performed, the photographed image is displayed on the liquid crystal display 10. The photographed image displayed on the liquid crystal display 10 at this time is an image having undergone the image processings in which the change of the photographing mode is reflected.

When the photographed image is not desired, the user can change the photographing mode again. In that case, the above-described processing is repeated.

Immediately after photographing for recording or in a case where a satisfactory photographed image is obtained when the user visually checks the photographed image after changing the photographing mode, the user maintains the condition as it is, so that the data of the photographed image is recorded onto the recording medium 9 after a lapse of a predetermined time and the display condition of the liquid crystal display 10 is changed from the photographed image display to the live view display.

As described above, the digital camera 1 according to the present embodiment is provided with the photographing mode determiner 50 for automatically selecting one photographing mode from among a plurality of photographing modes based on the photographing condition when a subject is photographed and setting the selected photographing mode, and the kind of the photographing mode set by the photographing mode determiner 50 as well as the subject image is displayed on the liquid crystal display 10 and the finder display 3. Consequently, when the automatic determination of the photographing mode is performed, failure in photographing due to a mis-determination of the photographing mode can be reduced.

While in the description given above, an example is shown in which the automatic determination of the photographing mode is continuously performed at the time of live view display. However, the timing of the automatic determination of the photographing mode is not limited thereto.

Processing sequences in the digital camera 1 will be described with two examples. In the processing sequences described below, the photographing mode automatic selection mode is set.

<2. First Processing Sequence>

First, a first processing sequence will be described. Here, the processing sequence in the case where the automatic determination of the photographing mode is continuously performed at the time of live view display as described above will be described.

Figure 12:
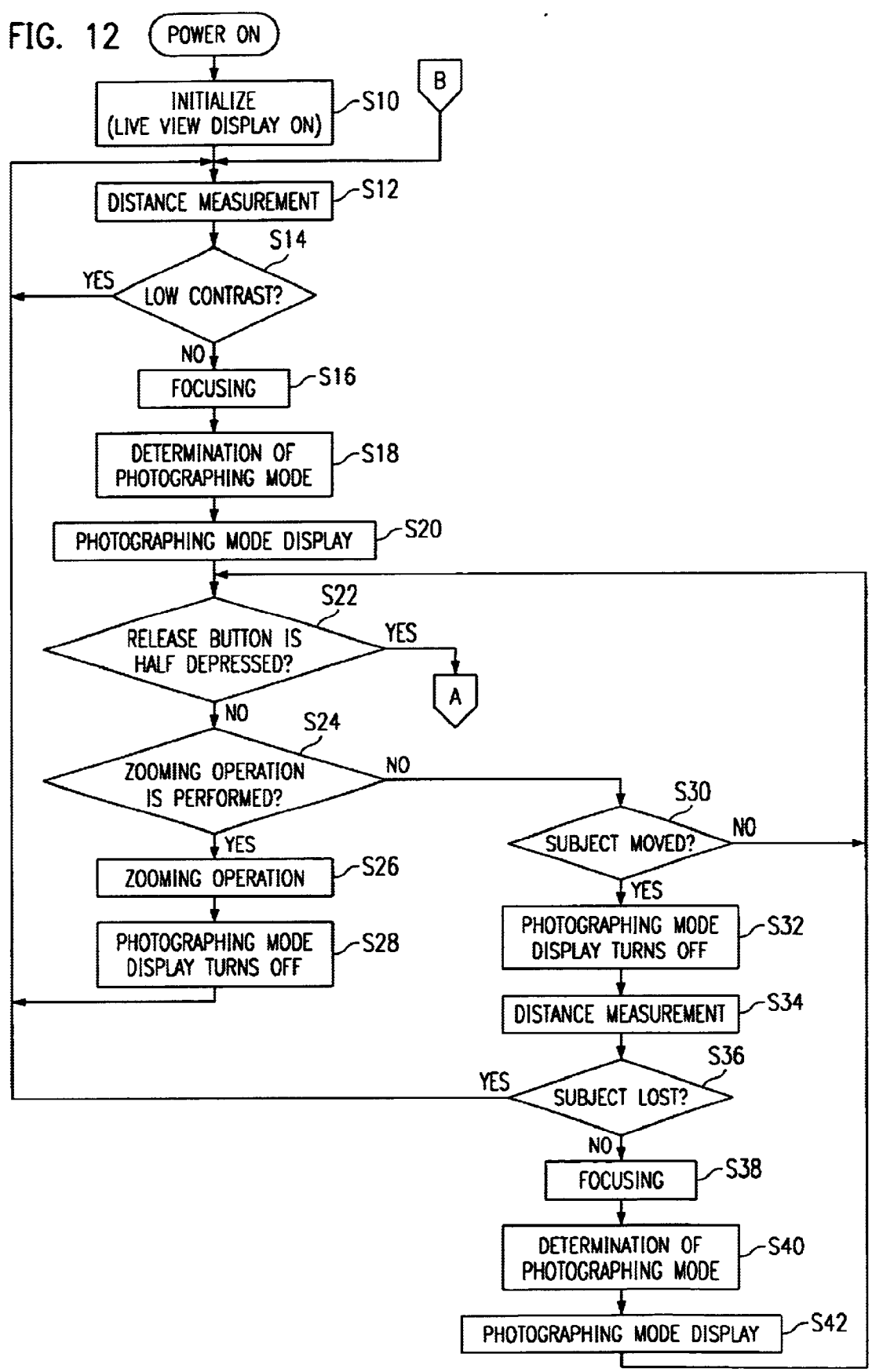
FIG. 12 is a flowchart showing a first processing sequence in the digital camera.
Figure 13:
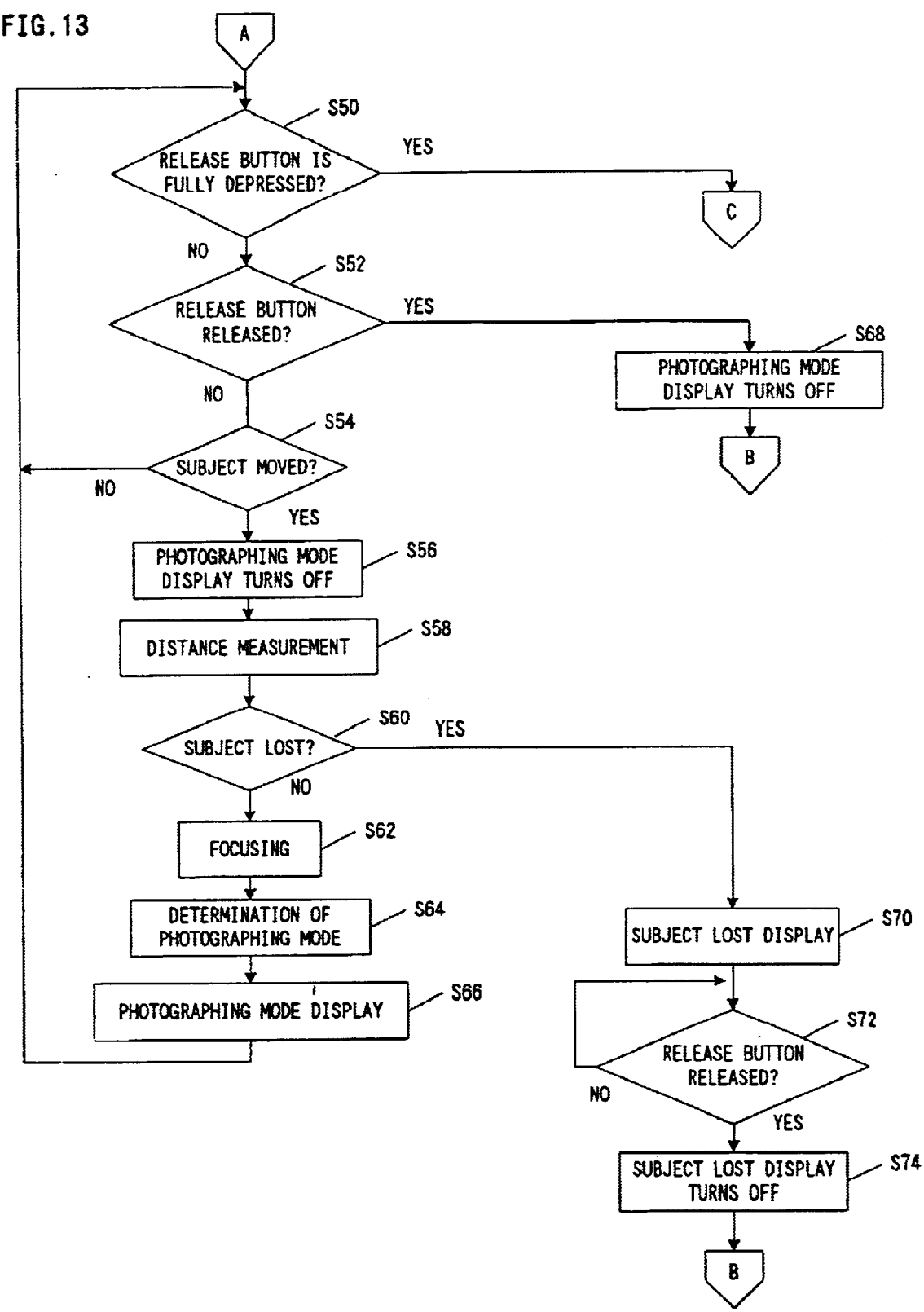
FIG. 13 is a flowchart showing the first processing sequence in the digital camera.
Figure 14:
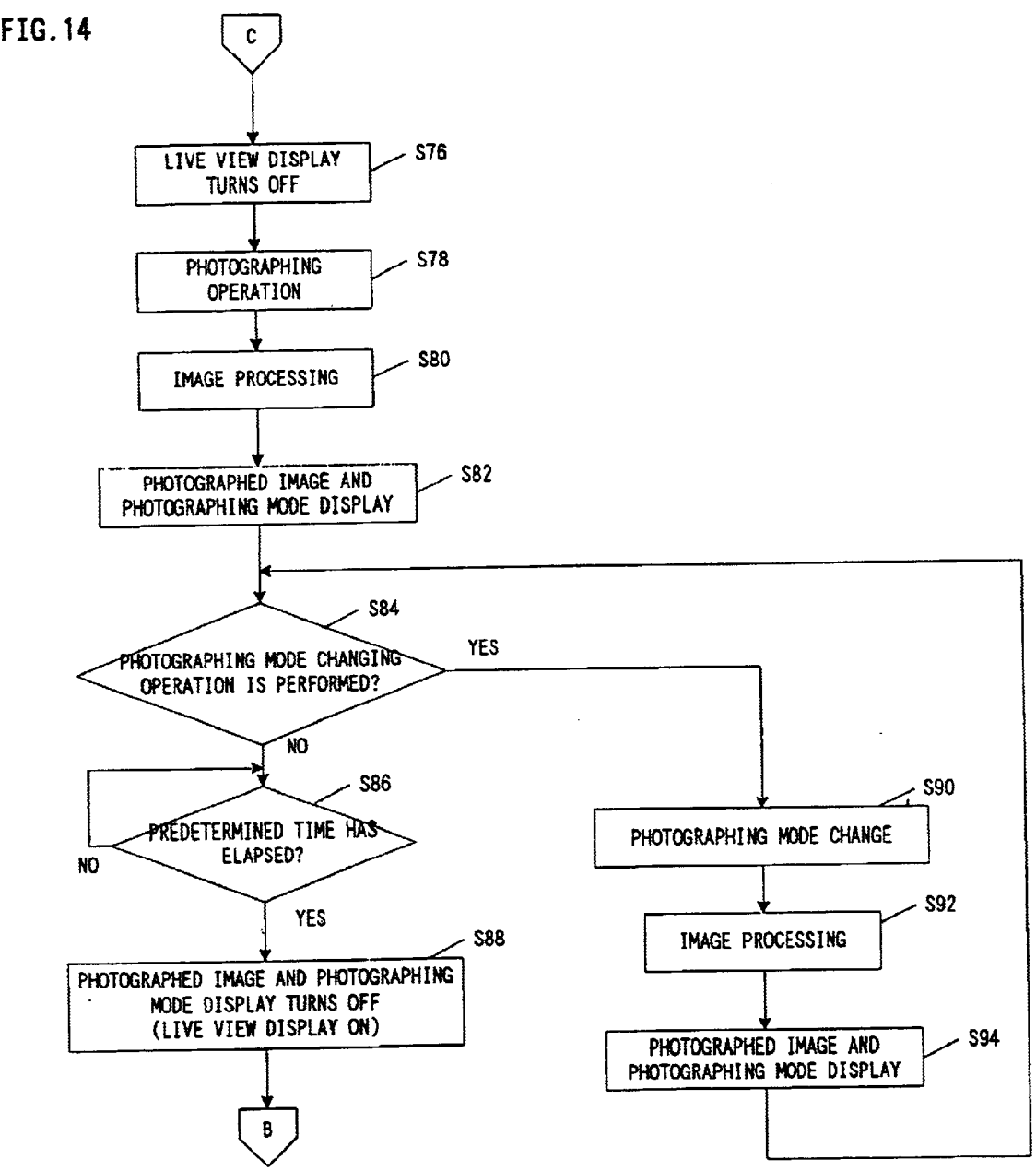
FIG. 14 is a flowchart showing the first processing sequence in the digital camera.

FIGS. 12 to 14 are flowcharts showing the first processing sequence in the digital camera 1.

When the digital camera 1 is turned on, the control CPU 40 performs the initialization of the digital camera 1 (step S10). At this time, the display controller 45 functions at the control CPU 40, and the live view display on the liquid crystal display 10 is turned on.

Then, live view display is performed based on the image data successively obtained by the CCD image sensing device 30, and distance measurement is performed at the distance measurement calculator 43 (step S12). At this time, the distance measurement calculator 43 determines whether the contrast of the image is low or not (step S14). When the contrast is low, determining that automatic focusing control is difficult, the process returns to step S12. When the contrast of the image is not low, distance measurement is appropriately performed at the distance measurement calculator 43, and the process proceeds to step S16 to perform focusing driving by the control CPU 40 driving the taking lens 11 based on the distance measurement value (step S16).

Then, the photographing mode determiner 50 functions, and the automatic determination of the photographing mode is performed (step S18). In this sequence, the photographing condition is recognized based on the information input from each element as described above, and one photographing mode is automatically selected from among a plurality of photographing modes in accordance with the photographing condition. When one photographing mode is selected by the automatic determination of the photographing mode, the selected photographing mode is displayed on both the liquid crystal display 10 and the finder display 3 by the display controller 45 of the control CPU 40 (step S20). It is as described above that the parameters based on the automatically selected photographing mode are set for each element.

Then, the control CPU 40 determines whether the release button 8 is half depressed or not (step S22). When it is half depressed, the process proceeds to the connector A shown in FIG. 13, and executes the process from step S50. When the release button 8 is not half depressed, the process proceeds to step S24, where the control CPU 40 determines whether a zooming operation is performed by the user or not (step S24).

When the zooming operation is performed, the control CPU 40 performs zooming by driving the zoom lens included in the taking lens 11 in accordance with the operation amount of the zoom key 15 (step S26). Then, the display controller 45 turns off the display of the photographing mode provided on the liquid crystal display 10 and the finder display 3 (step S28). The display of the photographing mode is turned off because it is necessary to perform automatic focusing control again because of the zooming and it is necessary to perform the automatic determination of the photographing mode again since there is a possibility that the currently set photographing mode is ineffective. Therefore, after the display of the photographing mode is turned off at step S28, the process returns to step S12 to perform distance measurement again.

When the zooming operation is not performed at step S24, the distance measurement calculator 43 determines whether the subject has made a movement or not (step S30). When the subject has made no movement, since it can be presumed that the currently set photographing mode is not changed, the process returns to step S22 to wait for the release button 8 to be half depressed.

However, when the subject has made a movement, since it is necessary to perform automatic focusing control again and there is a possibility that the currently set photographing mode is ineffective, the display of the photographing mode is turned off (step S32) and the distance measurement by the distance measurement calculator 43 is performed (step S34).

Then, the distance measurement calculator 43 determines whether or not the subject is lost track of in the image data obtained from the CCD image sensing device 30 (step S36). For example, the distance measurement value obtained by the current distance measurement is compared with that obtained by the previous distance measurement, and when the difference between the values is not less than a predetermined value, the distance measurement calculator 43 can presume that the subject is lost track of. Consequently, the process returns to step S12 to execute the process from the distance measurement.

When the distance measurement calculator 43 determines that the subject is not lost track of at step S36, focusing driving of the taking lens 11 is performed based on the distance measurement value obtained by the distance measurement (step S38).

Then, the photographing mode determiner 50 functions, and the automatic determination of the photographing mode is performed like at step S18 (step S40). Then, the display controller 45 of the control CPU 40 displays the photographing mode on the liquid crystal display 10 and the finder display 3 (step S42). Then, the process returns to step S22 to wait for the release button 8 to be half depressed.

Proceeding to the flowchart of FIG. 13, when the release button is half depressed, the control CPU 40 determines whether the release button 8 is fully depressed or not (step S50). When the release button 8 is fully depressed, the process proceeds to the connector C shown in FIG. 14 to execute the process from step S76. When the release button 8 is not fully depressed, the process proceeds to step S52, where the control CPU 40 determines whether the release button 8 is released from the half depressed condition or not.

When the release button 8 is released from the half depressed condition, the display controller 45 turns off the display of the photographing mode on the liquid crystal display 10 and the finder display 3 (step S68), and to execute the process from the distance measurement at the beginning, the process proceeds to the connector B shown in FIG. 12 to execute the process from step S12.

On the contrary, when the release button 8 is not released from the half depressed condition, the distance measurement calculator 43 determines whether the subject has made a movement or not (step S54). When the subject has made no movement, since it can be presumed that the currently set photographing mode is not changed, the process returns to step S50 to wait for the release button 8 to be fully depressed.

However, when the subject has made a movement, since it is necessary to perform automatic focusing control again and there is a possibility that the currently set photographing mode is ineffective, the display of the photographing mode is turned off (step S56), and the distance measurement by the distance measurement calculator 43 is performed (step S58).

Then, the distance measurement calculator 43 determines whether or not the subject is lost track of in the image data obtained from the CCD image sensing device 30 like at the above-described step S36 (step S60).

In a case where the subject is lost track of when the release button 8 is half depressed, an appropriate photographed image cannot be taken. Therefore, when it is determined that the subject is lost track of, the display controller 45 provides a display indicating that the subject is lost track of on the liquid crystal display 10 and the finder display 3. By doing this, it can be expected that the user will release the release button 8 from the half depressed condition.

Step S72 is a processing to wait for the release button 8 to be released from the half depressed condition. When the release button 8 is released from the half depressed condition, the display controller 45 turns off the display indicating that the subject is lost track of (step S74). Then, to execute the process from the distance measurement at the beginning, the process proceeds to the connector B shown in FIG. 12 to execute the process from step S12.

On the contrary, when the distance measurement calculator 43 determines that the subject is not lost track of at step S60, based on the distance measurement value obtained by the distance measurement (step S58), focusing driving of the taking lens 11 is performed (step S62).

Then, the photographing mode determiner 50 functions, and the automatic determination of the photographing mode is performed like at step S18 and so forth (step S64). Then, the photographing mode is displayed on the liquid crystal display 10 and the finder display 3 by the display controller 45 of the control CPU 40 (step S66). Then, the process returns to step S50 to wait for the release button 8 to be fully depressed.

Proceeding to the flowchart of FIG. 14, when the release button 8 is fully depressed, the display controller 45 of the control CPU 40 turns off the display of the live view image (step S76). Then, the control CPU 40 controls each element for photographing for recording, and performs photographing by the CCD image sensing device 30 (step S78). At this time, photographing based on the photographing mode automatically determined at step S18, S40 or S64 is performed. The image data output from the CCD image sensing device 30 is stored in the memory 41, and undergoes image processings in accordance with the photographing mode at the image processors such as the WB corrector 32 (step S80). The image data having undergone the image processings in accordance with the photographing mode is supplied to the liquid crystal display 10.

Then, the display controller 45 of the control CPU 40 functions, and the photographed image and the photographing mode set at the time of photographing is displayed on the liquid crystal display 10 (step S82). This enables the user to recognize in which photographing mode the photographed image displayed on the liquid crystal display 10 is obtained. When the condition of the photographed image is unsatisfactory, the user changes the contents of the image processings performed on the photographed image by performing the above-described predetermined manual operation.

The control CPU 40 determines whether the photographing mode changing operation is performed by the user or not (step S84). When the photographing mode changing operation is performed, the process proceeds to step S90. When the photographing mode changing operation is not performed, the process proceeds to step S86.

When the photographing mode changing operation is performed, the control CPU 40 changes the photographing mode based on the instruction from the user (step S90), and then, sets parameters based on the photographing mode to the image processors such as the WB corrector 32.

The control CPU 40 instructs the memory 41 to output the image data associated with the photographed image, and controls each element so that image processings based on the changed photographing mode are performed (step S92). The image data output from the memory 41 undergoes image processings in accordance with the changed photographing mode at the WB corrector 32, the gamma corrector 33, the color interpolator 34, the color corrector 35 and the aperture converter/corer 36, and is supplied to the liquid crystal display 10.

Then, the photographed image and the photographing mode are displayed (step S94), so that the user can visually recognize the kind of the changed photographing mode as well as the photographed image in a condition where the photographing mode is changed. The user checks the display screen, and when the condition of the photographed image is unsatisfactory, changes the contents of the image processings performed on the photographed image by repeating the photographing mode changing operation. Therefore, after the photographed image and the photographing mode when the photographing mode is changed are displayed (step S94), the process returns to step S84 to determine whether the photographing mode is changed or not.

When the photographing mode changing operation is not performed, the control CPU 40 determines whether a predetermined time has elapsed or not, and continues the display of the photographed image obtained by photographing for recording and the photographing mode until the predetermined time elapses (step S86). Then, after the predetermined time has elapsed, the display of the photographed image on the liquid crystal display 10 is turned off, and the display of the photographing mode at the time of photographing for recording or the changed photographing mode is turned off. Then, the live view display is turned on so that the live view image is again displayed on the liquid crystal display 10 (step S88). This allows the digital camera 1 to be ready for the next photographing for recording. Then, the process proceeds to the connector B shown in FIG. 12 to repeat the process from step S12.

While the first processing sequence ends with the above, it is to be noted that when the photographing mode desired by the user is not selected as a result of the automatic determination of the photographing mode at step S18, S40 or S64, the user can manually change the photographing mode.

By performing the first processing sequence as described above, in the digital camera 1, when focusing is performed, the photographing mode determiner 50 automatically selects one photographing mode from among a plurality of photographing modes, and focusing in the digital camera 1 is continuously performed after the digital camera 1 is turned on. In other words, in the digital camera 1, after the power is turned on, the automatic determination of the photographing mode is continuously performed. Therefore, after turning on the digital camera 1, the user can always check the automatically determined photographing mode. Consequently, when a mis-determination of the photographing mode occurs, the user can recognize it, and by manually changing the photographing mode, failure in photographing can be reduced.

<3. Second Processing Sequence>

Next, a case where the automatic determination of the photographing mode is performed when the user half depresses the release button 8 will be described as a second processing sequence.

Figure 15:
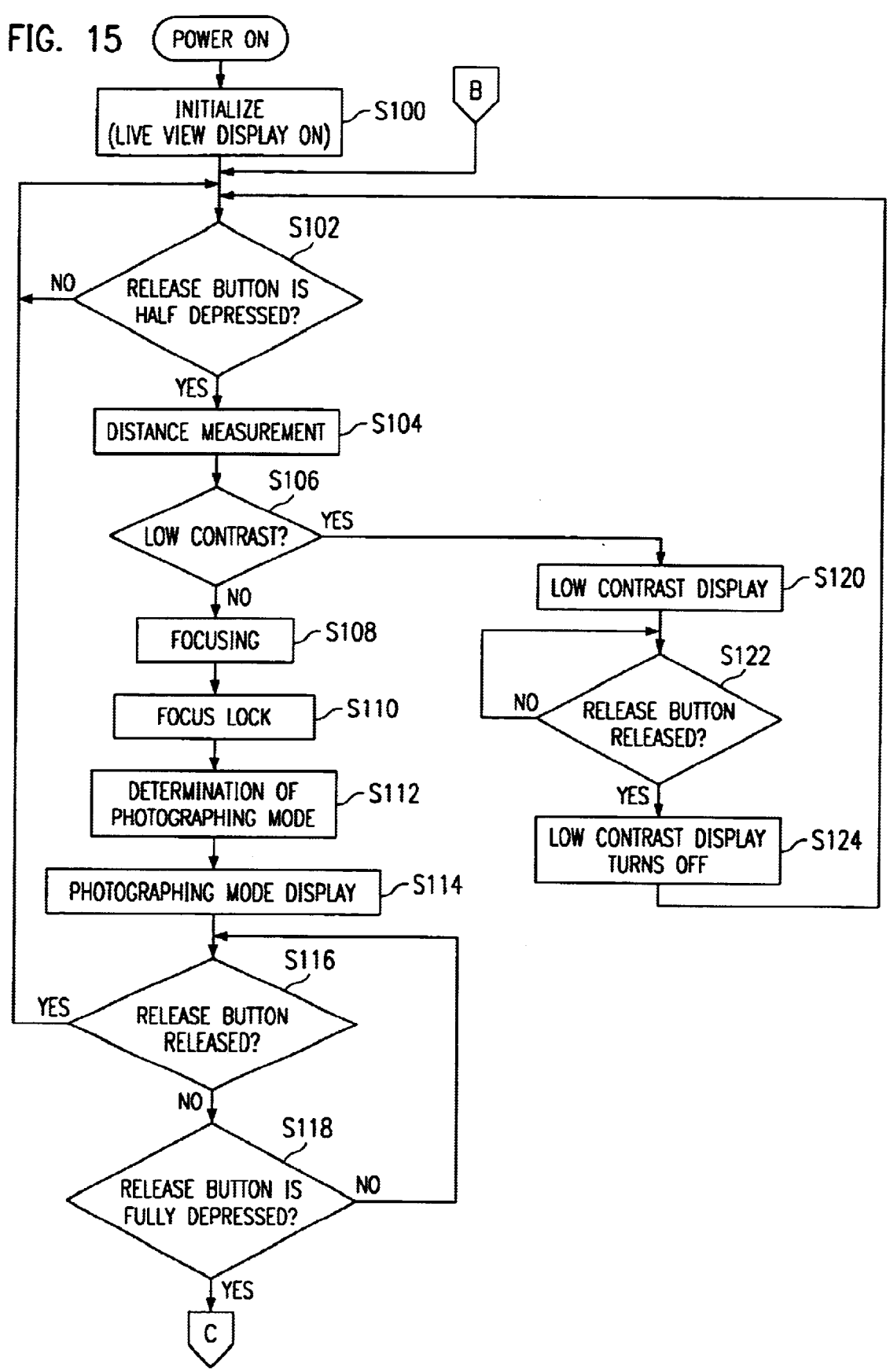
FIG. 15 is a flowchart showing a second processing sequence in the digital camera.

FIG. 15 is a flowchart showing the second processing sequence in the digital camera 1. The connector C shown in FIG. 15 connects to the connector C shown in FIG. 14, and to the connector B shown in FIG. 15, the connector B shown in FIG. 14 connects.

When the digital camera 1 is turned on, the control CPU 40 performs the initialization of the digital camera 1 (step S100). At this time, the display controller 45 functions at the control CPU 40, and the live view display on the liquid crystal display 10 is turned on.

The control CPU 40 waits until the release button 8 is half depressed (step S102), and when the release button 8 is half depressed, the process proceeds to step S104.

When the release button 8 is half depressed, distance measurement based on the image data for live view display successively obtained by the CCD image sensing device 30 is performed at the distance measurement calculator 43 (step S104). The distance measurement calculator 43 determines whether the contrast of the image is low or not (step S106). When the contrast is low, it being determined that automatic focusing control is difficult, a display indicating that the contrast is low is provided (step S120), and the user is prompted to release the release button from the half depressed condition. It is desirable that the display indicating that the contrast is low be provided not only on the liquid crystal display 10 but also on the finder display 3. Then, the process waits until the user releases the release button 8 from the half depressed condition (step S122). When the release button 8 is released from the half depressed condition, the display indicating that the contrast is low is turned off (step S124), and the process returns to step S102.

When it is determined at step S106 that the contrast is not low, distance measurement is appropriately performed at the distance measurement calculator 43, and focusing is performed by the control CPU 40 driving the taking lens 11 based on the distance measurement value (step S108). When focusing is completed, the control CPU 40 performs focus lock in preparation for photographing for recording (step S110).

Then, the photographing mode determiner 50 functions, and the automatic determination of the photographing mode is performed (step S112). When one photographing mode is selected by the automatic determination of the photographing mode, the photographing mode is displayed on both the liquid crystal display 10 and the finder display 3 by the display controller 45 of the control CPU 40 (step S114). It is as described above that the parameters based on the automatically selected photographing mode are set for each element.

Then, the control CPU 40 determines whether the release button 8 is released from the half depressed condition or not (step S116). When it is released, the process returns to step S102 to wait until the release button 8 is half depressed. When the release button 8 is not released from the half depressed condition, the process proceeds to step S118 to determine whether the release button 8 is fully depressed or not. When the release button 8 is not fully depressed, the process returns to step S116 to wait until the release button 8 is released from the half depressed condition or fully depressed.

When the release button 8 is fully depressed, the process proceeds to the flowchart of FIG. 14, and photographing for recording as described above is performed. Then, the photographed image obtained by the photographing for recording and the photographing mode are displayed, and the photographing mode changing operation by the user is accepted.

While the second processing sequence ends with the above, it is to be noted that when the photographing mode desired by the user is not selected as a result of the automatic determination of the photographing mode at step S112, the user can manually change the photographing mode.

By performing the second processing sequence as described above, in the digital camera 1, when the user performs a predetermined operation on the operation member 20, specifically, when the user performs an operation on the release button 8, the photographing mode determiner 50 automatically selects one photographing mode from among a plurality of photographing modes. Therefore, at least when photographing for recording of a subject is performed, the user can check the automatically determined photographing mode. Consequently, when a mis-determination of the photographing mode occurs, the user can recognize it, and by suspending the operation of the release button 8 for photographing for recoding and manually changing the photographing mode, failure in photographing can be reduced. That is, since the user can check the automatically determined photographing mode before fully depressing the release button 8 for performing photographing for recording even in this case, failure in photographing is reduced.

<4. Modification>

While an embodiment of the present invention has been described, the present invention is not limited to the above-described contents.

For example, in the above description, an example is shown in which when the automatic determination of the photographing mode is performed, the photographing mode is displayed as character information on the liquid crystal display 10 and the finder display 3, the present invention is not limited thereto. For example, an icon associated with each photographing mode may be set so that the result of the automatic determination is shown by means of the icon.

Figure 16:
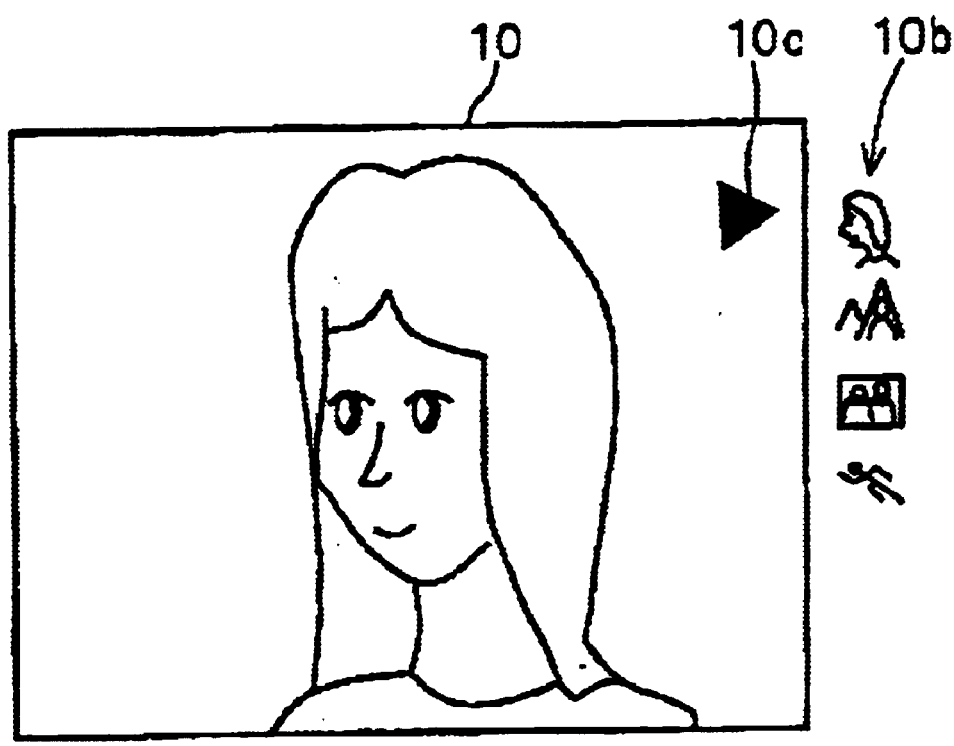
FIG. 16 shows a modification of a photographing mode display form.

FIG. 16 shows a modification of the photographing mode display form. For example, the display form may be such that as shown in FIG. 16, symbols corresponding to a plurality of photographing modes are printed in a peripheral part 10b of the liquid crystal display 10 and a mark display 10c for associating the automatically determined photographing mode is provided on the liquid crystal display 10. With this display form, the user can also easily visually recognize which photographing mode is selected.

While in the above description, an example is shown in which all of the photographing magnification, the focal length, the luminance, the light source and the movement of the subject when the subject is photographed are considered as the photographing condition when the automatic determination of the photographing mode is performed, the automatic determination of the photographing mode may be performed with consideration given to at least one of them.

While in the above description, an example is shown in which when one photographing mode is selected by the photographing mode determiner 50, the exposure control, whether to use flash or not, the gamma correction value, the sharpness processing and the color correction value are determined in accordance with the selected photographing mode, it may be performed to set at least one of them.

While the digital camera 1 is described as an example of the image forming apparatus in the above-described embodiment, the scope of the present invention is not limited to digital cameras. It is to be noted that to other kinds of image forming apparatuses such as scanners, the technology is applicable that the photographing mode (for example, the original reading mode) is automatically determined and the result of the determination is displayed.

As described above, according to the present invention, one photographing mode is automatically selected from among a plurality of photographing modes based on the photographing condition when a subject is photographed, and the kind of the selected photographing mode is displayed on the display means together with the subject image, so that even if the automatically selected photographing mode is a mis-determined one, the user can recognize it. Consequently, failure in subject photographing can be reduced.

Although the present invention has been fully described in connection with the preferred embodiments thereof with reference to the accompanying drawings, it is to be noted that various changes and modifications are apparent to those skilled in the art. Such changes and modifications are to be understood as included with in the scope of the present invention as defined by the appended claims unless they depart therefrom.

What is claimed is:

1. An image forming apparatus comprising:

an image pickup part for forming an image of the subject, a photographing mode automatically setting part for automatically selecting one photographing mode from among a plurality of photographing modes based on a photographing condition when the subject is photographed, and setting the selected photographing mode, a display part for displaying the image of the subject; and a display control part for displaying on the display part a kind of the photographing mode set by the photographing mode automatically setting part together with the image of the subject.

2. The image forming apparatus according to claim 1, further comprising:

a focusing part for bringing the image of the subject to in-focus state, and wherein the photographing mode automatically setting part automatically selects the photographing mode when the focusing part performs focusing.

3. The image forming apparatus according to claim 2, wherein the focusing is continuously performed after power is turned on.

4. The image forming apparatus according to claim 2, further comprising:

an operation member for a user to input an instruction, and wherein the focusing is performed when the operation member is operated.

5. The image forming apparatus according to claim 4, wherein the operation member is a release button for instructing the image pickup part to perform image formation.

6. The image forming apparatus according to claim 1, wherein the display control part displays, after photographing for photographing the image of the subject is performed by the image forming part, on the display part the image obtained by the photographing and the kind of the photographing mode set by the photographing mode automatically setting part at the time of the photographing.

7. The image forming apparatus according to claim 6, further comprising:

a storage part for storing image data obtained by photographing by the image pickup part;

a photographing mode changing part for changing the photographing mode set by the photographing mode automatically setting part based on an instruction; and a image processing part for obtaining the image data stored in the storage part and performing an image processing suitable for the changed photographing mode.

8. The image forming apparatus according to claim 1, wherein the photographing condition is at least one of the photographing magnification, the focal length, the luminance, the light source and the movement of the subject.

9. The image forming apparatus according to claim 1, wherein the photographing mode setting part sets a photographing control parameter at least one of the exposure control, whether to use flash or not, the gamma correction value, the sharpness processing and the color correction value in accordance with the selected photographing mode.

10. A method of forming an image of a subject comprising:

(a) a step of automatically selecting one photographing mode from among a plurality of photographing modes based on a photographing condition when the subject is photographed, and setting the selected photographing mode;

(b) a step of displaying the photographing mode together with an image of the subject on a predetermined display part; and (c) a step of, when a photographing instruction is provided, performing photographing by applying the photographing mode, and generating a image of the subject.

11. An image forming apparatus comprising:

an image pickup part for forming an image of the subject, a selecting part for automatically selecting a photographing mode at the time of photographing;

a display part for displaying the image of the subject; and a display control part for displaying a kind of the photographing mode selected by the selecting part and the image of the subject on the display part.

12. The image forming apparatus according to claim 11, wherein the photographing mode is displayed by the display control part so as to be superimposed on the image of the subject.

13. The image forming apparatus according to claim 11, wherein the selecting part selects one photographing mode from among a plurality of photographing condition when the subject is photographed.

14. The image forming apparatus according to claim 13, wherein the photographing condition is at least one of the photographing magnification, the focal length, the luminance, the light source and the movement of the subject.

15. The image forming apparatus according to claim 13, wherein the selecting part sets a photographing control parameter at least one of the exposure control, whether to use flash or not, the gamma correction value, the sharpness processing and the color correction value in accordance with the selected photographing mode.

* * * * *

UNITED STATES PATENT AND TRADEMARK OFFICE
CERTIFICATE OF CORRECTION

PATENT NO. : 6,614,996 B2
DATED : September 2, 2003
INVENTOR(S) : Noriyuki Okisu et al.

It is certified that error appears in the above-identified patent and that said Letters Patent is hereby corrected as shown below:

<u>Column 20,</u>
Line 42, after "photographing", insert -- modes based on a photographing --.

Signed and Sealed this

Eighteenth Day of May, 2004

JON W. DUDAS
*Acting Director of the United States Patent and Trademark Office*